(12) United States Patent
Schwarz et al.

(10) Patent No.: US 8,282,835 B2
(45) Date of Patent: Oct. 9, 2012

(54) REMOVAL OF SELENIUM FROM REFINERY WASTEWATER

(75) Inventors: Daniel E. Schwarz, Aurora, IL (US); Jitendra T. Shah, Naperville, IL (US)

(73) Assignee: Nalco Company, Naperville, IL (US)

( * ) Notice: Subject to any disclaimer, the term of this patent is extended or adjusted under 35 U.S.C. 154(b) by 353 days.

(21) Appl. No.: 12/721,139

(22) Filed: Mar. 10, 2010

(65) Prior Publication Data

US 2011/0220583 A1  Sep. 15, 2011

(51) Int. Cl.
*B01D 21/00* (2006.01)
*C02F 1/52* (2006.01)
*B03D 3/00* (2006.01)

(52) U.S. Cl. ........ 210/722; 210/721; 210/723; 210/724; 210/725; 210/728; 210/727; 210/729

(58) Field of Classification Search .................. 210/719, 210/721, 722, 723–729
See application file for complete search history.

(56) References Cited

U.S. PATENT DOCUMENTS

| | | | | |
|---|---|---|---|---|
| 5,510,040 | A | * | 4/1996 | Miller et al. ................... 210/721 |
| 5,993,667 | A | * | 11/1999 | Overman ....................... 210/709 |
| 7,138,063 | B1 | * | 11/2006 | Teter et al. .................... 210/717 |
| 7,419,602 | B2 | | 9/2008 | Alexander et al. |

OTHER PUBLICATIONS

Chamberlain, Paul D., *Selenium Removal from Waste Waters—an Update*, Randol Gold Forum, 1996, Randol International, pp. 119-123.
Kapoor et al., Removal of Selenium from Water and Wastewater, *Environmental Studies*, vol. 49, 1995, pp. 137-147.
Pourbaix, M. *Atlas of Electro Chemical Equilibria in Aqueous Solutions*, NACE International, 1974, Translated from French by James A. Franklin.

* cited by examiner

*Primary Examiner* — Christopher Upton
*Assistant Examiner* — Nader Hossaini
(74) *Attorney, Agent, or Firm* — Benjamin E. Carlsen; Andrew D. Sorenson

(57) ABSTRACT

The invention provides a method of efficiently removing selenium from water. The method involves: adding an oxidant to the liquid, adjusting the liquid's pH to below 7.5, adding ferric salt in an amount such that less than a quarter of selenium in the liquid precipitates and adding a poly dithiocarbamate material to the liquid in an amount such that the amount of poly dithiocarbamate material (in ppm) is greater than the amount of ferric salt (in ppm). This method removes far more selenium than previous methods, and does it using a smaller amount of expensive chemicals. Moreover this method makes it far more likely to achieve cost effective compliance with the ever-increasing environmental standards for selenium in water.

10 Claims, 1 Drawing Sheet

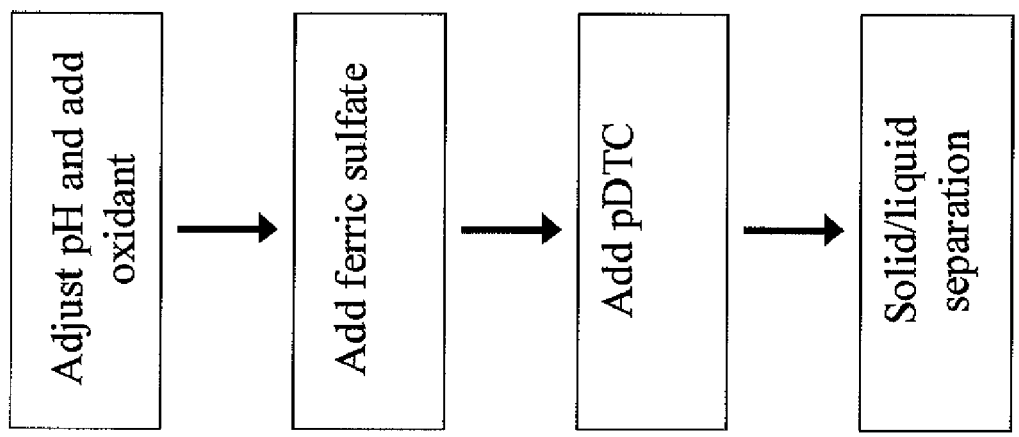

US 8,282,835 B2

REMOVAL OF SELENIUM FROM REFINERY WASTEWATER

CROSS-REFERENCE TO RELATED APPLICATIONS

None.

STATEMENT REGARDING FEDERALLY SPONSORED RESEARCH OR DEVELOPMENT

Not Applicable.

BACKGROUND OF THE INVENTION

This invention relates to compositions of matter and methods of using them to remove selenium from fluids. Selenium compounds are reported to comprise 0.9 ppm of the earth's crust. Selenium is an important as a trace mineral used to make the enzyme glutathione peroxidase, which is involved in fat metabolism and therefore is found in many living organisms. It is commonly found in various amounts in crude oil, coal, and other fossil fuels originating from the decomposed organic matter or leached out of the nearby minerals. Selenium compounds are also found naturally in ground waters and in agricultural runoffs from the use of selenium containing insecticides and herbicides.

Unfortunately, selenium is known to be highly toxic and it can cause harm even in small quantities. Harmful effects include dermatitis, central nervous system disturbance, nephrosis, hemorrhagic necrosis of the pancreas and adrenal cortex, and when in large enough dosages, death. As a result, many localities have limited the permissible amount of selenium in domestic supplies of water at 10 ppb. As a result, wastewater produced from activity involving selenium-containing materials is difficult to dispose of. In addition, because of its toxicity, even these strict standards may be uniformly further limited in the future.

The chemical properties of selenium however make its removal from solutions difficult and complex. Although insoluble when in its elemental state, selenium has four oxidation states (−2, +2, +4, and +6), which allows it to readily form a number of compounds that are highly soluble and therefore very hard to remove from solution. (See Kapoor et al., Removal of Selenium from Water and Wastewater, Environmental Studies, Vol. 49, pp. 137-147 (1995)). As a result, prior art removal methods have been either disappointing or in some cases mostly ineffective. One prior art method, described in U.S. Pat. No. 7,419,602 involves the use of a ferric salt, pH adjustment, and an oxidant but in practice is less than 70% effective. Another method described in U.S. Pat. No. 5,510,040 describes a method using poly dithiocarbamate materials which while more effective also involves considerable expense.

Thus there is a clear need for and utility in an improved method of removing selenium from solution. The art described in this section is not intended to constitute an admission that any patent, publication or other information referred to herein is "prior art" with respect to this invention, unless specifically designated as such. In addition, this section should not be construed to mean that a search has been made or that no other pertinent information as defined in 37 C.F.R. §1.56(a) exists.

BRIEF SUMMARY OF THE INVENTION

At least one embodiment of the invention is directed towards a method of removing selenium from a liquid comprising the steps of: adding an oxidant to the liquid, adjusting the liquid's pH to below 7.5, adding ferric salt in an amount such that less than a quarter of selenium in the liquid precipitates, and adding a dithiocarbamate material to the liquid in an amount such that the amount of dithiocarbamate groups in the material (in ppm) is greater than the amount of ferric salt (in ppm). The dithiocarbamate material may be selected from the group consisting of PDTC, DTC, and any combination thereof. The liquid may be water. The water may be sour stripper water. The pH may be lowered by the addition of sulfuric acid, HCl, $H_3PO_4$, and any combination thereof. The ferric salt may be selected from the group consisting of ferric sulfate, ferric chloride, ferrous sulfate, ferrous chloride, and any combination thereof. The ferric salt may be added in an amount of between 1-300 ppm. The dithiocarbamate material may be between 50% to 300% of the amount (in ppm) of ferric salt added to the liquid.

The method may comprise adding a sulfur bearing coagulant to the liquid. The method may reduce the amount of selenium in the liquid from more than 1000 ppb to less than 40 ppb. The oxidant may be selected from the list consisting of hydrogen peroxide, ozone, $KMnO_4$, NaClO, $ClO_2$, peracetic acid, sodium percarbonate, carbamide peroxide, sodium persulfate, and any combination thereof.

BRIEF DESCRIPTION OF THE DRAWINGS

A detailed description of the invention is hereafter described with specific reference being made to the drawings in which:

FIG. 1 is a flowchart illustrating one embodiment of the inventive method.

DETAILED DESCRIPTION OF THE INVENTION

Definitions

For purposes of this application the definition of these terms is as follows:

"PDTC" means poly dithiocarbamate which includes all forms of polymers which have dithiocarbamate functional groups present.

"DTC" means dithiocarbamate.

"Selenite means a selenium bearing composition of matter having a chemical formula of $HSeO_3^-$.

"Sour Water" means a liquid waste product produced as a byproduct of chemical, and more typically petrochemical, processing.

"Stripping" refers to a process that removes byproducts, such as ammonia and hydrogen sulfide, along with a portion of water from a liquid stream. Stripping is commonly performed in a distillation column in which the liquid stream flows down the column and gas flows up the column to "strip" off contaminants from the liquid.

"Stripper Sour Water" means sour water that has been run through a stripper process.

"Wastewater" means water generated from any industrial plant or industrial process the byproducts therefrom.

In the event that the above definitions or a definition stated elsewhere in this application is inconsistent with a meaning (explicit or implicit) which is commonly used, in a dictionary, or stated in a source incorporated by reference into this application, the application and the claim terms in particular are understood to be construed according to the definition in this application, and not according to the common definition, dictionary definition, or the definition that was incorporated by reference.

In at least one embodiment, selenium is removed from a selenium containing liquid by a method comprising the steps of adding an oxidant to the liquid, adjusting the liquid's pH to below 7 (preferably 6), adding ferric salt in an amount such that less than a quarter of selenium in the liquid precipitates and adding a poly dithiocarbamate material to the liquid in an amount such that the amount of poly dithiocarbamate material (in ppm) is greater than the amount of ferric salt (in ppm).

In at least one embodiment, the oxidant is selected from the list consisting of hydrogen peroxide ozone, $KMnO_4$, NaClO, $ClO_2$, peracetic acid, sodium percarbonate, carbamide peroxide, sodium persulfate, and any combination thereof. In at least one embodiment the pH is lowered by the addition of an acid selected from the list consisting of sulfuric acid HCl, $H_3PO_4$, and any combination thereof. In at least one embodiment the ferric salt is selected from the group consisting of ferric sulfate, ferric chloride, ferrous sulfate, ferrous chloride, and any combination thereof. In at least one embodiment the ferric salt is added in an amount of between 1-300 ppm. In at least one embodiment the poly dithiocarbamate material is between 50% to 300% of the amount (in ppm) of ferric salt added to the liquid.

Without being limited to theory it is believed that the oxidizing and pH environment cause the selenium to convert into selenite which in turn forms a complex with the ferric salts that are efficiently coagulated by the poly dithiocarbamate material and removed from solution. Limiting the drop in pH prevents the selenium from forming other compounds that would be harder to remove. By forcing the $SeO_3^{2-}$ to convert into $HSeO_3^-$ selenite facilitates the best conditions for the ferric ions to bind with selenium and therefore smaller amounts of ferric ions can be used. The use of PDTC precipitates the ferric-selenite adduct which can be efficiently separated from solution. In contrast, the prior art depended on co-precipitation methods at higher pH (>8) that only operate with high concentrations of ferric ion. This co-precipitation method depends on using an excess of hydrolyzed iron-oxide material to absorb a relatively small amount of Se containing material.

In at least one embodiment the pH, pE, voltage potential, and SHE (standard hydrogen electrode) (in volts) are modulated to conform with the conditions described in the textbook Pourbaix, M. *Atlas of Electro Chemical Equilibria in Aqueous Solutions*, NACE Cebelcor (1974) and in particular pp. 554-559, (Translated from French by James A. Franklin) as being optimal for the formation and maintenance of the selenium in the form of selenite.

In at least one embodiment the water is stripper sour water from an oil refinery. In these embodiments the selenium removal is a particular accomplishment as the repeated passage of the sour water through a distillation column results in an ever-increasing concentration of selenium in the sour water. In addition, sour stripper water is generally highly reducing so most of the selenium is in the form of selenite, selenocyanates and other organic selenium species. Successive experimentation has shown that the inventive method effectively removes more than 95% of the selenium in stripper sour water.

The ratio of iron material to PDTC is important and must be tuned for each water source. In at least one embodiment, the ratio of iron material to PDTC is 1:4 mols of iron sulfate to mols of dithiocarbamate functional groups (using a 10% actives iron sulfate solution). In another embodiment, the ratio of iron material to PDTC is 1:2. The ideal range falls between the two examples and is entirely water dependent.

In a number of alternate embodiments, the above methods are performed using DTC in the place of PDTC.

EXAMPLES

The foregoing may be better understood by reference to the following examples, which are presented for purposes of illustration and are not intended to limit the scope of the invention:

Numerous samples of stripper sour water were obtained from a refinery. These samples contained large amounts of selenium. The samples were then treated according to prior art and the inventive methods of removing selenium. The remaining water then underwent elemental analysis using an Inductively Coupled Plasma technique to determine how much selenium remained in the samples.

TABLE 1

Comparative study of selenium removal methods from sour waste water

| Run# | Test Liquid | pH | Oxidant (ppm) | Ferric Sulfate (ppm) | PDTC (ppm) | Residual Se (ppb) | Comments |
|---|---|---|---|---|---|---|---|
| 1 | Untreated Water | ? | 0 | 0 | 0 | 1400 | — |
| 2 | Treated Water | 6 | 0 | 500 | 200 | 1100 | Not Very Effective |
| 3 | Treated Water | 6 | 500 | 0 | 500 | 270 | — |
| 4 | Treated Water | 6 | 500 | 200 | 500 | 40 | Good Treatment |
| 5 | Treated Water | 7 | 500 | 200 | 200 | 30 | Good Treatment |

The data shows that the most effective application of this process occurs in the pH range 6-7 which is where there is a majority of $HSeO_3^-$ (selenite). This form is more easily complexable with the ferric ion and ultimately PDTCB. This aggregate forms large floc particles, which can be separated by some solid-liquid separation method. Typically refinery wastewater has a pH of >7 and thus needs to be adjusted lower through the addition of acid.

While this invention may be embodied in many different forms, there are shown in the drawings and described in detail herein specific preferred embodiments of the invention. The present disclosure is an exemplification of the principles of the invention and is not intended to limit the invention to the particular embodiments illustrated. All patents, patent applications, scientific papers, and any other referenced materials mentioned herein are incorporated by reference in their entirety. Furthermore, the invention encompasses any possible combination of some or all of the various embodiments described herein and incorporated herein.

All ranges and parameters disclosed herein are understood to encompass any and all subranges subsumed therein, and every number between the endpoints. For example, a stated range of "1 to 10" should be considered to include any and all subranges between (and inclusive of) the minimum value of 1 and the maximum value of 10; that is, all subranges beginning with a minimum value of 1 or more, (e.g. 1 to 6.1), end ending with a maximum value of 10 or less, (e.g. 2.3 to 9.4, 3 to 8, 4 to 7), and finally to each number 1, 2, 3, 4, 5, 6, 7, 8, 9, and 10 contained within the range.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

This completes the description of the preferred and alternate embodiments of the invention. Those skilled in the art may recognize other equivalents to the specific embodiment described herein which equivalents are intended to be encompassed by the claims attached hereto.

What is claimed is:

1. A method of removing selenium from a liquid comprising the steps of:
    adding an oxidant to the liquid,
    adding a sulfur bearing coagulant to the liquid,
    adjusting the liquid's pH to between 5-7,
    adding ferric salt in an amount such that less than a quarter of selenium in the liquid precipitates,
    adding a poly dithiocarbamate material comprising dithiocarbamate functional groups to the liquid in an amount such that the amount of dithiocarbamate functional groups (in ppm) is greater than the amount of ferric salt (in ppm)
    forming a selenium containing floc particle in which the majority of the selenium is in the form of $HSeO_3^-$, and
    separating the floc particle from the liquid with a solid-liquid separation method.

2. The method of claim 1 in which the liquid is water.

3. The method of claim 1 in which the liquid is sour stripper water.

4. The method of claim 1 in which the pH is lowered by the addition of sulfuric acid HCl, $H_3PO_4$, and any combination thereof.

5. The method of claim 1 in which the ferric salt is selected from the group consisting of ferric sulfate, ferric chloride, ferrous sulfate, ferrous chloride, and any combination thereof.

6. The method of claim 1 in which the ferric salt is added in an amount of between 1-300 ppm.

7. The method of claim 1 in which the dithiocarbamate functional groups is between 150% to 300% of the amount (in ppm) of ferric salt added to the liquid.

8. The method of claim 1 in which the method reduces the amount of selenium in the liquid from more than 1000 ppb to less than 40 ppb.

9. The method of claim 1 in which the oxidant is selected from the list consisting of hydrogen peroxide, ozone, $KMnO_4$, NaClO, $ClO_2$, peracetic acid, sodium percarbonate, carbamide peroxide, sodium persulfate, and any combination thereof.

10. A method of removing seliunium from a liquid comprising the steps of:
    adding an oxidant to the liquid,
    adjusting the liquid's pH to below 7.5,
    adding ferric salt in an amount such that less than a quarter of selenium in the liquid precipitates, and
    adding a DTC material to the liquid in an amount such that the amount of DTC material (in ppm) is greater than the amount of ferric salt (in ppm).

* * * * *